(12) United States Patent
Conway

(10) Patent No.: US 7,207,830 B2
(45) Date of Patent: Apr. 24, 2007

(54) ELECTRICAL BOX

(76) Inventor: Raymond Leonard Conway, 4490 Stratford Ct., Batavia, OH (US) 45103

( * ) Notice: Subject to any disclaimer, the term of this patent is extended or adjusted under 35 U.S.C. 154(b) by 11 days.

(21) Appl. No.: 11/003,589

(22) Filed: Dec. 3, 2004

(65) Prior Publication Data

US 2005/0095927 A1    May 5, 2005

(51) Int. Cl.
    *H01R 13/58*    (2006.01)
(52) U.S. Cl. .......................... 439/467; 361/42
(58) Field of Classification Search ................ 439/452, 439/457, 465, 467, 367–372; 361/42
    See application file for complete search history.

(56) References Cited

U.S. PATENT DOCUMENTS

| | | | | |
|---|---|---|---|---|
| 5,378,174 A | * | 1/1995 | Brownlie et al. | 439/709 |
| 5,755,588 A | * | 5/1998 | Sweatman et al. | 439/369 |
| 6,099,340 A | * | 8/2000 | Florentine | 439/367 |
| 6,854,996 B2 | * | 2/2005 | Yaworski et al. | 439/276 |
| 7,037,128 B2 | * | 5/2006 | Yaworski et al. | 439/276 |
| 2004/0157488 A1 | * | 8/2004 | Yaworski et al. | 439/519 |
| 2005/0092589 A1 | * | 5/2005 | Conway | 200/300 |
| 2005/0095927 A1 | * | 5/2005 | Conway | 439/843 |

* cited by examiner

*Primary Examiner*—Jmaes R. Harvey

(57) ABSTRACT

An electrical box suitable for safely and efficiently housing an electrical connection. The electrical box comprises a bottom and a plurality of adjacent side walls, each side wall being at least partially joined to the bottom and to each adjacent side wall to form an open box. Each side wall has a top edge wherein the top edges define an open box perimeter. A top is hingedly joined to one the top edges of one the side walls and is adapted to be moveable from an open position to a closed position. At least one the side walls comprises at least one notch, the notch comprising deformable plastic members that can be biased in an open position to define a conductor opening to receive at least one of the electrical conductors, the conductor opening being at least partially defined by the top when the top is in the closed position.

1 Claim, 3 Drawing Sheets

ELECTRICAL BOX

FIELD OF THE INVENTION

The invention relates to electrical boxes for housing electrical connections.

BACKGROUND OF THE INVENTION

Electrical boxes for making safe and secure electrical connections are known. For example, metal or plastic boxes, often known as junction boxes, are often used to make connections of household wiring. Known boxes for this purpose often have predetermined openings in the sides that can be removed to permit entry of wiring to be connected. These openings may be formed by removing a portion of the side, so called "knock outs", or they may be made by deforming a portion of the box side to bend about a hinge line, thereby defining an opening in which wiring or cables can enter the box. Once the conductors to be connected have each entered the interior of the box via one or more of the predetermined openings, the connection can be made, the box cover placed on and secured, and the connection is complete.

One of the drawbacks with current boxes is the relative difficulty in facilitating entry of the conductors into the box. Often the portion of the side wall of the box to be removed must be knocked out with a tool such as a hammer. Often it must be pried out with a tool such as a screw driver. This can be especially difficult with metal boxes, for example.

Another drawback with current boxes is that the top, or lid, is easy to misplace, or forget when doing an electrical connection. For example, an electrician making connections in an attic may forget to bring along the top to a junction box, thereby necessitating an inconvenient and time-consuming trip out of the attic to retrieve the top.

Accordingly, there is a need for an electrical box, e.g., improved junction box, for making electrical connections that minimizes or eliminates the need to remember the top with each junction box.

Additionally, there is a need for an electrical box that is adapted to permit the making of electrical connections faster and easier within the box.

SUMMARY OF THE INVENTION

An electrical box suitable for safely and efficiently housing an electrical connection is disclosed. The electrical box comprises a bottom and a plurality of adjacent side walls, each side wall being at least partially joined to the bottom and to each adjacent side wall to form an open box. Each side wall has a top edge wherein the top edges define an open box perimeter. A top is hingedly joined to one the top edges of one the side walls and is adapted to be moveable from an open position to a closed position. At least one the side walls comprises at least one notch, the notch comprising deformable plastic members that can be biased in an open position to define a conductor opening to receive at least one of the electrical conductors, the conductor opening being at least partially defined by the top when the top is in the closed position.

DETAILED DESCRIPTION OF THE INVENTION

Figure 1:
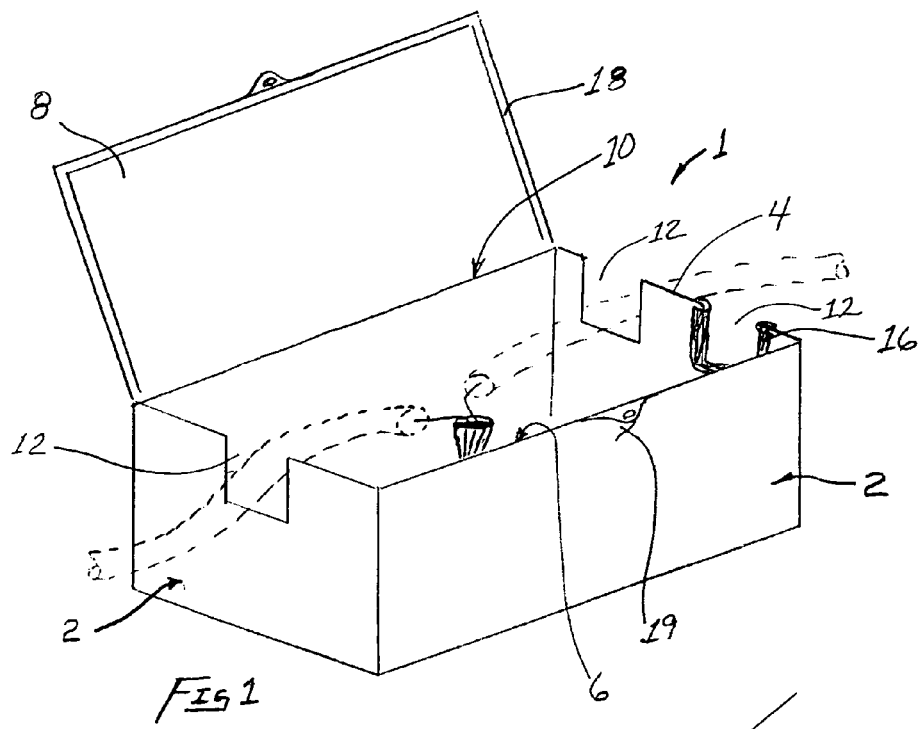
FIG. 1 is a perspective view of one embodiment of an electrical box of the present invention.

One embodiment of an electrical box of the present invention is shown in FIG. 1. As shown, box 1 has side walls 2 joined to a bottom, which together form an open container. Although FIG. 1 shows a typical arrangement of four side walls 2 forming a rectangular box, the invention is not limited only to such a typical configuration. In general, any configuration of three or more side walls 2 will suffice. The top edges 4 of side walls 2 define a peripheral open edge 6 of the open container. Top 8 is hingedly joined at hinge 10 to one of the top edges 4, such that the top 8 can close shut, substantially sealing the container about the peripheral open edge 6. A notch or cut-out portion 12 of the top edge 4 of at least one side wall 2 defines a conductor opening adapted to receive at least on conductor, as shown in dotted line in FIG. 1, but it is understood that the conductors shown do not necessarily form a part of the invention. In one embodiment, connectors can form an embodiment of the invention. A connection can be made inside the box, as represented in dotted lines in FIG. 1 by two conductors joined by a typical wire nut, and the top closed such that the connection is safely and efficiently housed within box 1.

Although FIG. 1 shows two notches 12, one on each of two opposing side walls 2, there could be more, and only one is necessary for the present invention. For example, both conductors to be connected can be placed into the box 1 via one notch 12 and still enjoy the advantages of the present invention. Likewise, although the notches 12 are shown in FIG. 1 as being substantially rectangular in shape, the shape is not determinant of the invention For example, the shape of notches 12 for conductor openings can be practically any geometric shape, and can be shaped to fit specific cross-sectional sizes of specific conductors. Further, it is contemplated that the notches 12 of the present invention can be fitted with suitable grommets or pliable seals to provide a weatherproof fitting at the conductor openings, as well as providing for some strain relief on the conductors. For example, as shown in FIG. 1, a substantially "U"-shaped seal 16 can be suitably fitted to the edges of notches 12 by methods known in the art, such as by press fitting about a longitudinal groove in seal 16. Once top 8 is shut, optional sealing gasket member 18 can complete the seal about conductor notches 12 to provide for a weatherproof enclosure, Of course, any known sealing material, such as rubber, neoprene, polymeric elastomer materials, or other polymeric or pliable materials can be used for seal 16 or gasket member 18. Likewise, any suitable shape and size of seal 16 can be incorporated for proper sealing properties. In fact, a generally circular, or other closed shape of seal can be used, recognizing that such a seal would necessarily need to be fitted onto the electrical conductor prior to making an electrical connection inside the box. The closed shape seal then could be appropriately positioned along the length of the electrical conductor until it coincided with notch 12 to make a weather proof seal after closing top 8.

Top 8 can be a separate member attached by a hinge connection to one of side walls 2. For example, top 8 can be joined by a "piano" hinge. However, in a preferred embodiment, top 8 is integral with the side wall 2 to which it is joined. In a preferred embodiment, the bottom, side walls 2, and top 8 are molded of impact resistant plastic material as a unitary structure, with hinge 10 being a living hinge. As such, the electrical box 1 of the present invention can be substantially molded in one piece, in a single mold. The box 1 can be molded by methods known in the art for producing molded articles. Top 8 can be retained in the shut position by methods known in the art. For example, top 8 can be held closed by any number of known snap connections, screw connections, e.g., screw connection 19, or simply by friction and force fit.

As can be appreciated by the skilled person, the advantages of the present invention are many. For example, since prior to closing the top 8 conductor notch 12 is partially defined by the top edge 4 of side wall 2, the conductor to be connected can enter the box across the top edge 4 of side wall 2. That is, there is no need to feed the conductor(s) through a hole in the side of the box, but the conductors can simply be "laid in" so to speak. This greatly simplifies the job of making electrical connections. In fact, connections can be made prior to putting the connected conductor ends into the box. This permits an electrician, for example, to make connections in the open, then fit them into what can be a relatively confined area of the electrical box 1.

Another advantage of the electrical box 1 of the present invention is the hingedly joined top 8. By being joined hingedly, top 8 is essentially one piece with electrical box 1, so that the top 8 is always with box 1 and does not get lost or misplaced. This can save much time and effort, for example when an electrician is working in the attic of a house making electrical connections. He or she need not need to remember to carry multiple parts to make a safe, complete connection. The hingedly-joined top 8 is particularly beneficial when hinge 10 is a living hinge, as this greatly simplifies production of the box 1. As is known in the art, a living hinge is integrally molded with the parts to be hinged together, the hinge simply being a thinned portion of the molded article. When a living hinge is utilized, therefore, box 1 can simply be molded by known means a one piece, with an integrally-hinged top.

Figure 2:
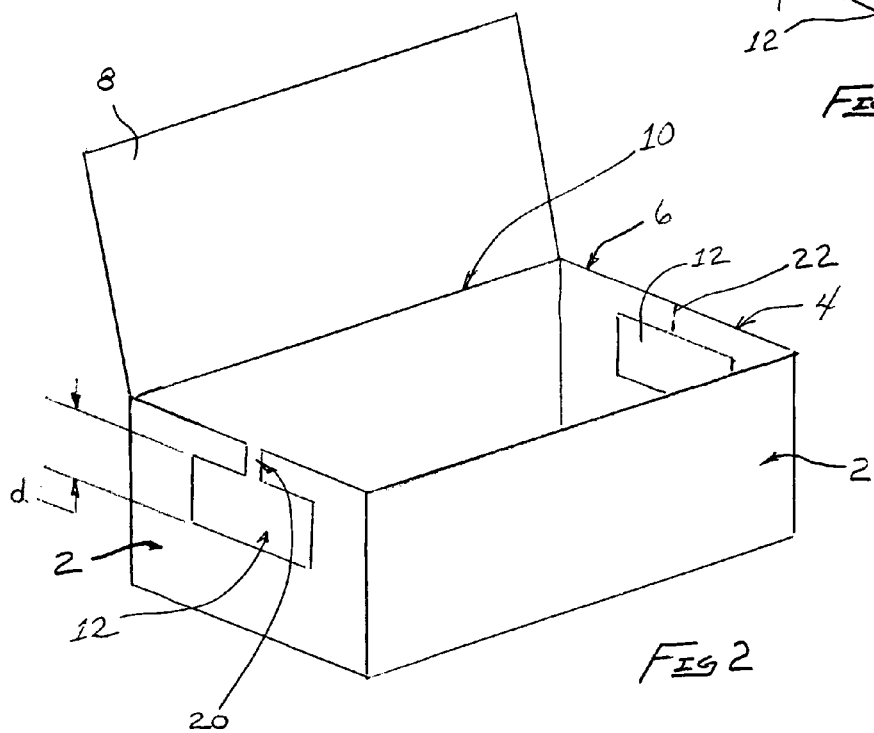
FIG. 2 is a perspective view of another embodiment of an electrical box of the present invention.

Other variations are contemplated for the present invention. For example, as shown in FIG. 2, conductor openings can be offset from top edge 4 of side wall 2 by a predetermined distance d, with a means for conductor access to the notch 12 for example, as shown on one side wall 2 of in FIG. 2, a slot 20 joins the top edge 4 of side wall 2 to notch 12. As shown on another side wall 2 of the electrical box 1 in FIG. 2, a frangible portion 22 is provided, which can be frangibly separated to form an open pathway to notch 12. Frangible portion 22, can be, for example, a thinned portion of side wall 2, or a perforated portion of side wall 2. As such, a simple twisting or tearing motion by a user can break frangible portion 22 to separate respective portions of side wall 2 to make an open pathway to notch 12 (similar to channel 20, discussed above).

The advantage of the embodiment shown in FIG. 2 is that the relatively constricted channel 20, or opened frangible portion 22, can help hold electrical conductors in place in the electrical box 1 prior to closing top 8. Therefore, the conductors are relatively constrained and cannot readily come out of the box 1 while the electrician is doing other things prior to finishing the connection of the electrical conductors.

Figure 3:
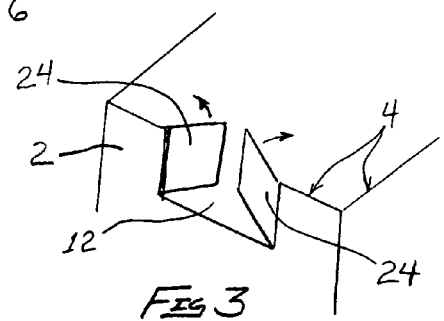
FIG. 3 is a detail view of an optional configuration for an opening in an electrical box of the present invention.

In either of the illustrated embodiments, notch 12 can be provided as-is as an actual opening, or it can be provided as an "openable"notch. That is, as shown in a detail of an embodiment of an notch 12 in FIG. 3, notch 12 can be formed by, for example, deformable plastic members 24 that can be biased into an open position. Therefore, notch 12 is provided for in a closed condition, but is openable by, for example, folding deformable plastic members 24 inwardly as shown in FIG. 3. Deformable plastic members 24 can be hingedly joined to edges of notch 12 and/or can be frangible members that can be removed prior to placing the conductor into notch 12. Deformable plastic members 24 can provide some sealing and strain relief functions.

Figure 4:
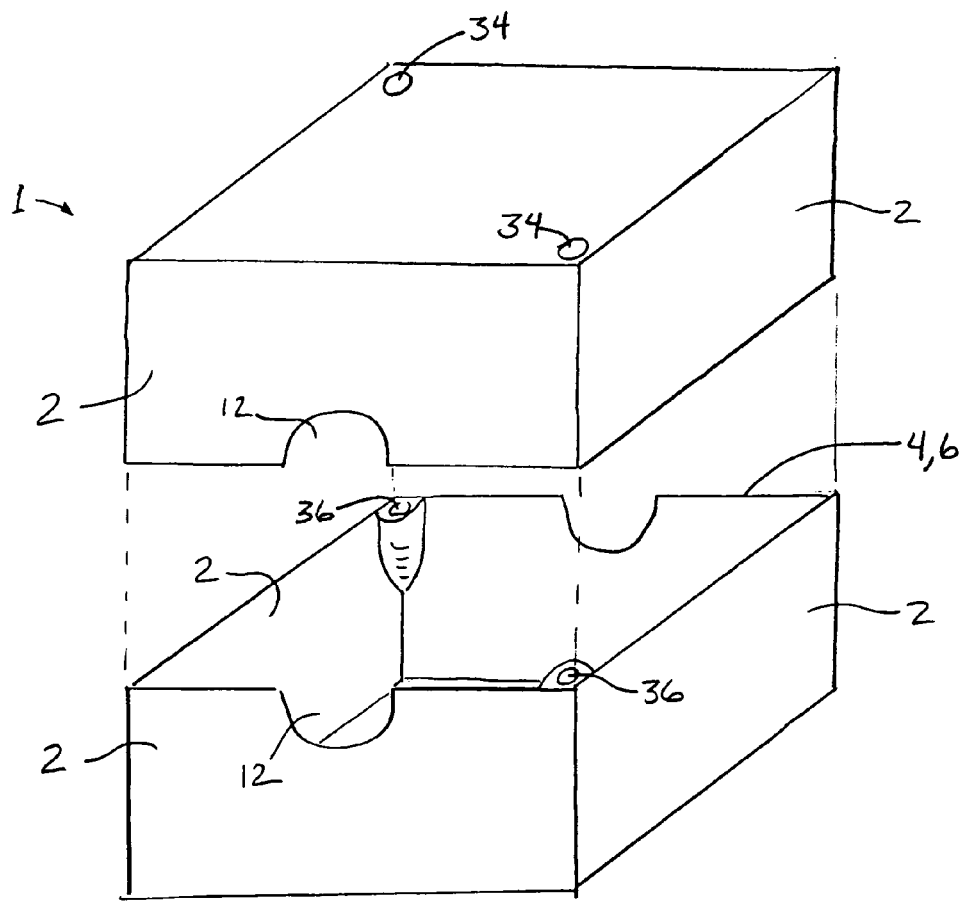
FIG. 4 is a perspective view of another embodiment of an electrical box of the present invention.

In another embodiment shown in FIG. 4, electrical box 1 can comprise two halves, 30 and 31, which can be substantially identical in size and shape. Each half can have the structure of a box having an open side, such that when the two halves are mated together, the electrical box 1 is an enclosed box enclosed on all sides and having conductor openings defined by the alignment of notches 12 in each half. Although FIG. 4 shows each half, 30, 31 in a typical arrangement of four side walls 2 joined to a bottom (or top, depending on which half is considered) forming a rectangular box, the invention is not limited only to such a typical configuration. In general, any configuration of three or more side walls 2 will suffice. As with the box of FIG. 1, the top edges 4 of side walls 2 define a peripheral open edge 6 of the open container 1.

Figure 5:
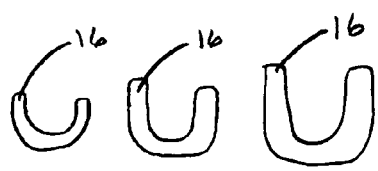
FIG. 5 is a view of grommets useful in an embodiment of the present invention.

Although FIG. 4 shows two notches 12 per half, one on each of two opposing side walls 2, there could be more, and only one notch per half is necessary for the present invention. For example, both conductors to be connected can be placed into the box 1 via one notch 12 and still enjoy the advantages of the present invention. The shape of notches 12 for conductor openings can be practically any geometric shape, and can be shaped to fit specific cross-sectional sizes of specific conductors. Further, it is contemplated that the notches 12 of the present invention can be fitted with suitable grommets or pliable seals to provide a weatherproof fitting at the conductor openings, as well as providing for some strain relief on the conductors. For example, as shown in FIG. 5, a substantially "U"-shaped seal 16 can be sized for suitably fitting to the edges of variously-sized notches 12 by methods known in the art, such as by press fitting about a longitudinally-oriented groove in seal 16. Of course, any known sealing material, such as rubber, neoprene, polymeric elastomer materials, or other polymeric or pliable materials can be used for seal 16. Likewise, any suitable shape and size of seal 16 can be incorporated for proper sealing properties. In fact, a generally circular, or other closed shape of seal can be used, recognizing that such a seal would necessarily need to be fitted onto the electrical conductor prior to making an electrical connection inside the box. The closed shape seal then could be appropriately positioned along the length of the electrical conductor until it coincided with notch 12 to make a weather proof seal after closing the two halves 30 and 31 together.

Two halves 30 and 31 can be held in a closed position to form electrical box 1 by any known means, including by screw connections in preformed holes 34 and threaded or threadable portions 36. However, any connection means can be used, including snap together connection members, pressfit frictional engagement members, tape, adhesive, welding or other known method of joining metal or plastic parts together.

Figure 6:
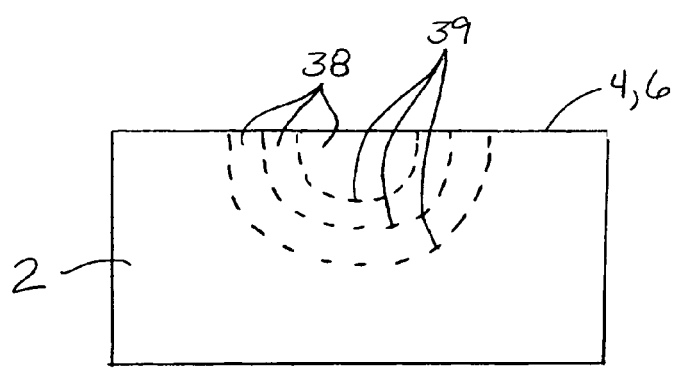
FIG. 6 is a side detail view of one portion of an embodiment of the present invention.

Notches 12 in sidewalls 2 can be made to be adjustably-sized. For example, notch 12 of side wall 2 shown in FIG. 6 can be formed and/or made larger by removing frangibly-joined removable portions 38 as required for a particular wire or cable size. Frangible portions 38 can be separated at line of weakness 39 which can be a perforated line, a scored line, or otherwise weakened to frangibly break in a desired shape, such as the generally circular rounded shape shown in FIG. 6. Multiple lines of weakness 39 can permit various sizes of openings at notches 12. Appropriately sized grommets or seals 16 as shown in FIG. 5 can be utilized as necessary for a snug, strain-relieved, or water resistant fit about wires passing through notch 12 that, together with the mating notch of half 30 or 31 forms a conductor opening into electrical box 1.

Figure 7:
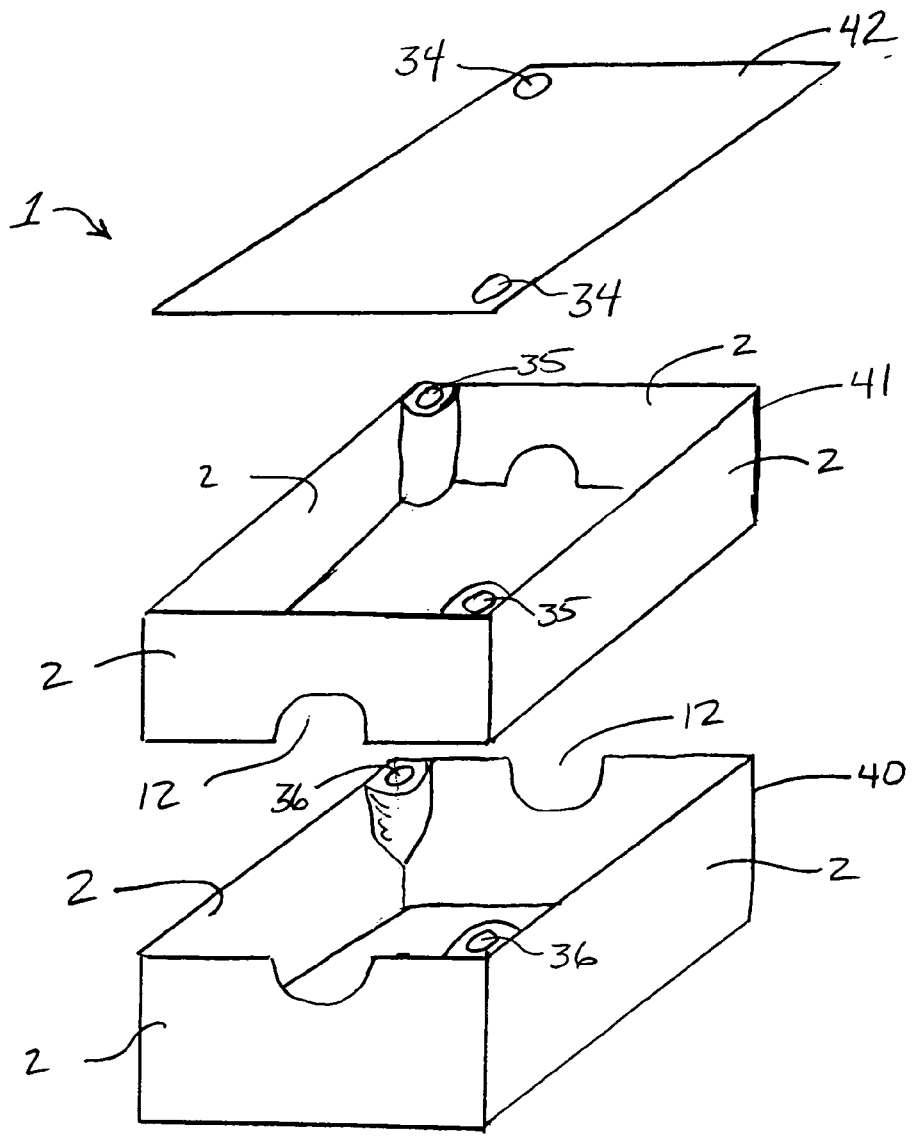
FIG. 7 is a perspective view of another embodiment of an electrical box of the present invention.

Another embodiment of electrical box 1 is shown in FIG. 7. As shown in FIG. 7, electrical box 1 can comprise at least three parts, a lower portion 40, an intermediate portion 41 and a top or lid portion 42. Similar to the electrical box shown in FIG. 4, the main difference is that intermediate portion 41 has neither a top or bottom, but is simply comprised of side walls 2. Therefore, while lower portion 40 has a bottom associated therewith to form an open box structure, intermediate portion is open top and bottom. Once wire connections are made, lower portion and intermediate portion 41 can be brought together in a manner such that notches 12 engage in mating fashion to form wire or cable openings, which can be generally circular in shape. To close the box and secure it against the elements, top or lid portion 42 can be affixed, such as by screws as is known in the art. For example, screws can attach top portion 42, intermediate portion 41 and lower portion 40 into an enclosed electrical box 1 by way of through holes 34 in top portion 42, through channels 35 in intermediate portion 41, and threaded or threadable holes 36 in lower portion 40.

Figure 8:
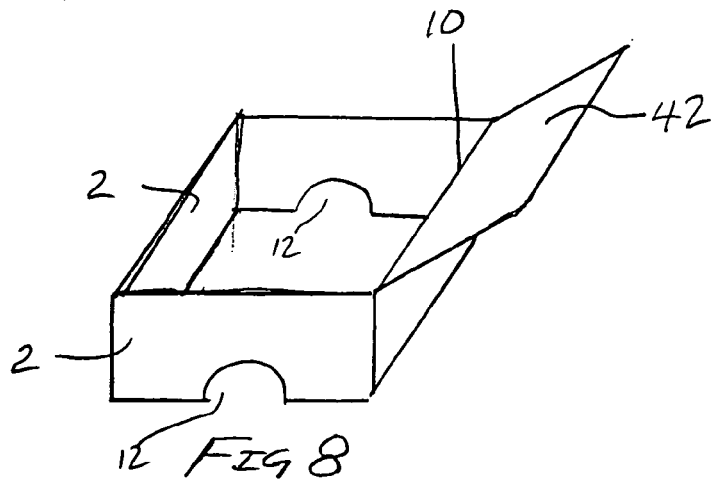
FIG. 8 is a perspective view of another embodiment of an electrical box of the present invention.

In another embodiment, partially shown in FIG. 8, top portion 42 and intermediate portion 41 can be joined by hinge 10 to form a hinged connection. Hinge 10 can be any of known hinges including living hinges formed by molding the two portions 41 and 42 together and using flexible, durable plastic material as is known in the art for living hinges on plastic parts and components.

Other known variations can be made to an electrical box 1 of the present invention without departing from the scope of the invention. For example, strain relief clamps can be positioned appropriately so as to provide for strain relief on the cables. In one embodiment, screw-down strain relief clamps as known in the art can be molded or otherwise joined to the outside of box 1 such that once the conductors are connected in the box 1, the clamps are screwed tight to secure the conductors from undesirable tension on the connection. Further, various mounting means, such as screw holes, nail guides, brackets and the like, as are known in the art for mounting to joists and the like, can be utilized with box 1. In general, therefore, any of known modifications to current electrical or junction boxes can be made to the box of the present invention.

I claim:

1. An electrical box suitable for safely and efficiently housing an electrical connection, the electrical connection being made between at least two electrical conductors, said electrical box comprising:
   a bottom
   a plurality of adjacent side walls, each said side wall being at least partially joined to said bottom and to each adjacent side wall to form an open box, each said side wall having a top edge wherein the top edges define an open box perimeter;
   a top hingedly joined to one said top edge of one said side wall and adapted to be moveable from an open position to a closed position;
   at least one said side wall comprising at least one notch, said notch comprising deformable plastic members that can be biased in an open position to at least partially define a conductor opening to receive at least one of the electrical conductors, said conductor opening being at least partially defined by said top when said top is in said closed position;
   wherein said top is unitary with said top edge of said side wall;
   wherein said top is hingedly joined by a living hinge;
   wherein said notch comprises frangible portions;
   wherein said notch includes a pliable seal;
   wherein said top comprises a pliable seal that at least partially seals with said open box perimeter when said top is in a closed position;
   said conductor opening being at least partially defined by said notch and a slot;
   said notch having a notch width and a notch length and said slot having a slot width and slot length; said slot length is less than said notch length and said slot width is less than said notch width.

* * * * *